July 19, 1955   A. F. STEICHEN   2,713,476
APPARATUS FOR TREATING GASES BY MEANS OF A LIQUID
Filed June 15, 1951   3 Sheets-Sheet 1
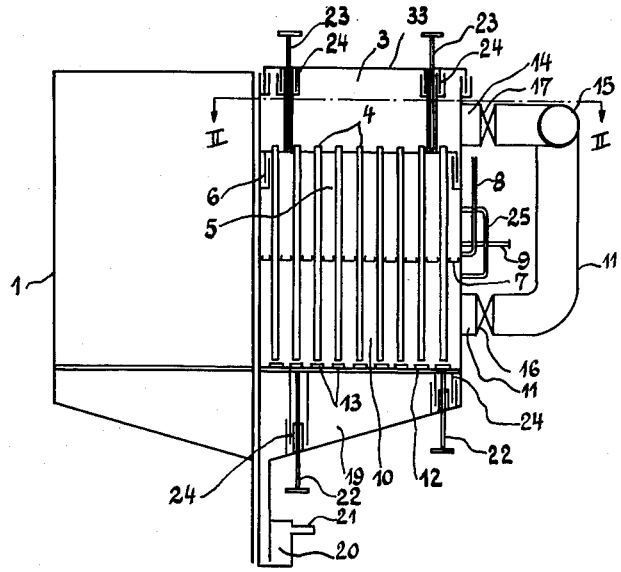
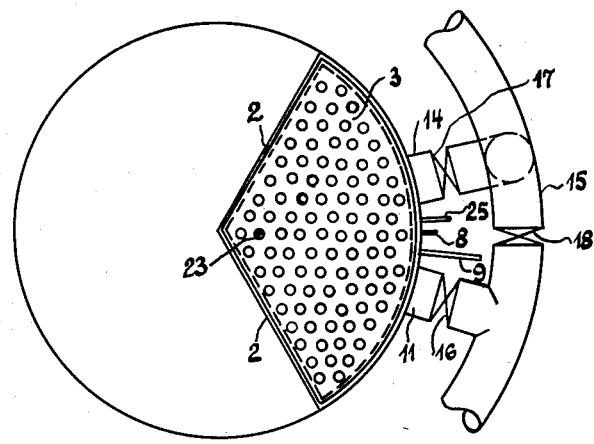
INVENTOR.
A. F. Steichen
BY
Henderoth, Lind + Ponack
Attorneys.

July 19, 1955  A. F. STEICHEN  2,713,476
APPARATUS FOR TREATING GASES BY MEANS OF A LIQUID
Filed June 15, 1951  3 Sheets-Sheet 2

INVENTOR.
A. F. Steichen
BY

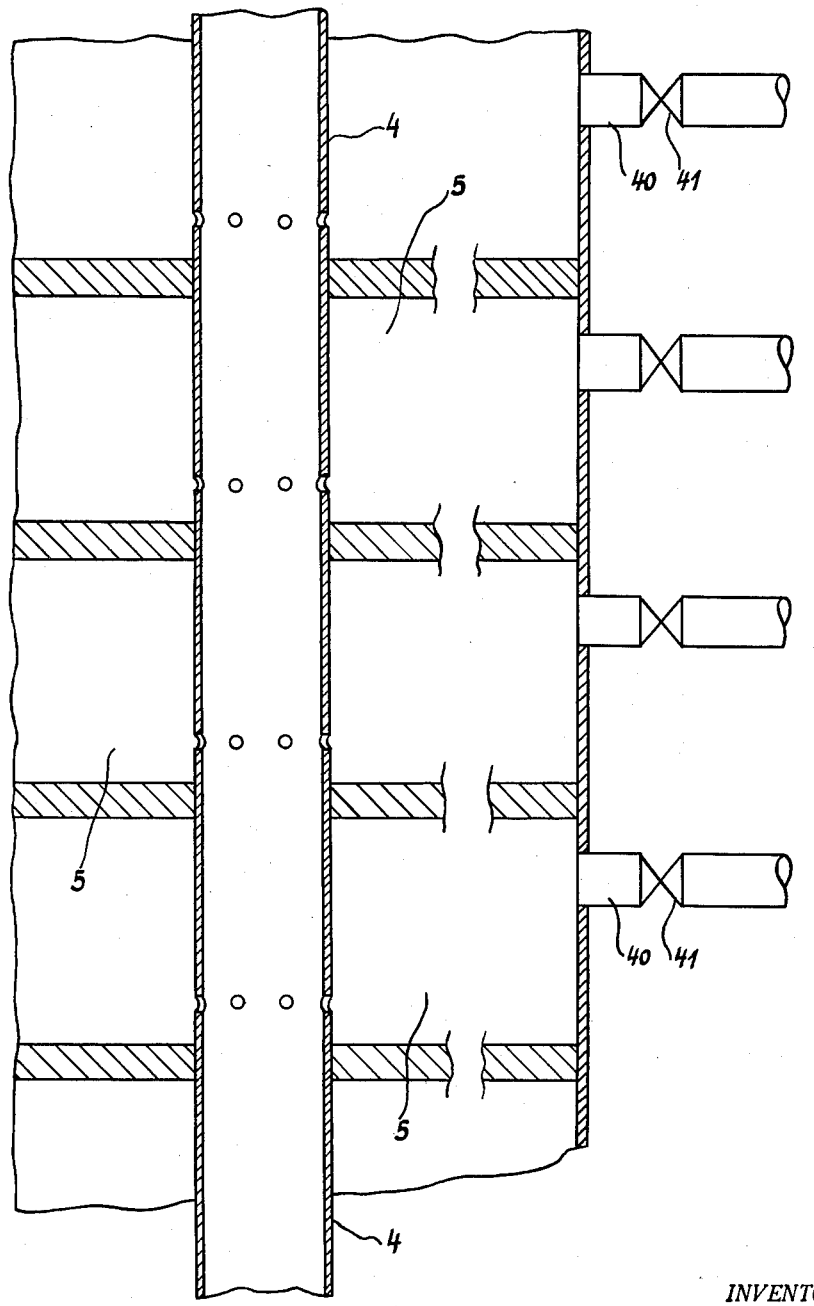

United States Patent Office 2,713,476
Patented July 19, 1955

2,713,476

APPARATUS FOR TREATING GASES BY MEANS OF A LIQUID

Adolphe Ferdinand Steichen, Anderlecht, Belgium

Application June 15, 1951, Serial No. 231,682

Claims priority, application Belgium June 28, 1950

2 Claims. (Cl. 261—21)

This invention relates to an apparatus for treating gases by means of a liquid, to purify such gases by removing therefrom dust, fine solid particles and fumes which may be contained therein, to promote heat exchange between the gases and the liquid, or to cause a reaction therebetween.

Gas purifiers are known, in which use is made of various means, namely impact of the gas against a surface, expansion, changes of direction, centrifugal force, electrostatic fields, etc . . .

More particularly, gas purifiers are known in which the gases are brought into contact with a liquid, either by forcing them across a liquid bath, or by spraying them with a liquid, in such a way that said liquid becomes loaded with the impurities of the gases or causes such impurities to precipitate.

Such known purifiers and the methods used therein generally have certain drawbacks. Thus, one of their main disadvantages is their lack of "flexibility," i. e. their inaptness to operate with an optimum efficiency under variable conditions. As a result of the latter drawback, a gas purifying plant, if expected to secure a satisfactory purification, should comprise a large number of apparatus, each performing a sharply defined function.

Thus, the purification of gases may require a series arrangement of apparatus such as cyclones for separating the large particles in suspension in the gases, electro filters for arresting the fine dust, washing towers, etc . . . Moreover, no satisfactory purification would be carried out in plants and by methods as hither to known, unless apparatus of large capacity, which is therefore expensive, are provided.

In well-known and widely used purifiers, the gases are forced across a layer of liquid, this layer being of unequal thickness or depth in various areas thereof, with the resulting occurrence of preferential passages for the gases, so that certain portions only of the liquid layer take an active part in the purification. This has a prejudicial effect on the efficiency of such purifiers.

Furthermore, methods are known in which the aforesaid steps, such as heat exchange, reaction between the gases and the liquid, drying or humidifying a gas by a liquid and absorption of a constituent of a gas by a liquid, are carried out in apparatus in which the liquid is caused to trickle onto a filling or in which the gas is bubbled through the liquid.

Such apparatus are bulky and, therefore, involve heavy expenditure. The perfect distribution of the liquid or of the gas in view of securing full contact between every portion of the gas and every portion of the liquid proves to be difficult or impossible to achieve without resorting to large quantities of liquid to be circulated.

Hence, powerful pumps consuming large amounts of motive power are required. Moreover, where the reactions as is generally the case—give off heat that should be carried away by cooling down the liquid under circulation, the large volume of the latter involves the provision of coolers having a very large surface and which are therefore cumbersome and expensive.

This invention has for its object to obviate the said drawbacks and relates to an apparatus adapted to be employed for the various uses hereinbefore referred to, viz: heat exchange between gases and liquids, purification of an industrial gas, reaction between a gas and a liquid, such as drying a gas by a water absorbent liquid, absorption of a constituent of a gas by a liquid, etc., such steps being carried out under whatever conditions are desired or imposed as far as amount of gas discharge, impurity content of the gases and expected efficiency are concerned.

The apparatus according to this invention is substantially characterized by the fact that the gas to be treated is circulated in the form of narrow jets, a liquid is introduced into each of the jets, a strong turbulence is set up, which brings about an intimate mixture between the gas and the liquid, and the jets of mixed gas and liquid are projected against an impact surface, preferably at a velocity of between 15 and 30 metres per second.

The apparatus according to the invention comprises a vessel having mounted therein tubes through which the gas to be treated is circulated, means for feeding liquid into each of the said tubes, an impact surface adapted to receive the jets of mixed gas and liquid issuing from the said tubes, and an expansion chamber.

In accordance with one particular embodiment of the invention, the aforesaid tubes are provided at their periphery with holes or slots in communication with an enclosure or shell containing the liquid to be admixed with the gas to be treated, means being conveniently provided for adjusting the cross sectional area of the said holes at will. Such means may comprise e. g. sleeves arranged concentrically with the tubes and having provided therein holes in register with holes provided in the walls of the tubes. By imparting a relative (rotary or axial) displacement to the said concentric sleeves, the holes therein may be brought more or less into register with the holes in the tubes.

According to another feature of the invention, the enclosure or shell containing the liquid to be admixed to the gas surrounds the said tubes for a portion of their length and is separated from the expansion chamber—across which the aforesaid tubes extend for the remainder of their length—by a partition perpendicular to the axis of the tubes.

According to still another feature of the invention, means are further provided for adjusting, at will, the distance between the impact surface and the ends of the tubes from whence the jets of mixed gas and liquid are projected onto the said impact surface. The impact surface may conveniently be formed by the free faces of plates made from a suitable material, such as sandstone, arranged opposite the ends of the tubes and mounted on a support which is preferably movable with respect to the tubes.

Further features of the invention will appear in the course of the disclosure of the drawings accompanying this specification and showing diagrammatically, and merely by way of example, one embodiment of an apparatus according to the invention, along with a few modifications of devices provided therein.

In the drawings:

Fig. 1 is a half sectional vertical elevation of an apparatus according to the invention;

Fig. 2 is a plan view partly in section on line II—II of Fig. 1;

Fig. 6 is a sectional view of a device including several levels of orifices for admitting liquid into the tubes.

Similar parts are indicated by the same references throughout the drawings.

Figure 3:
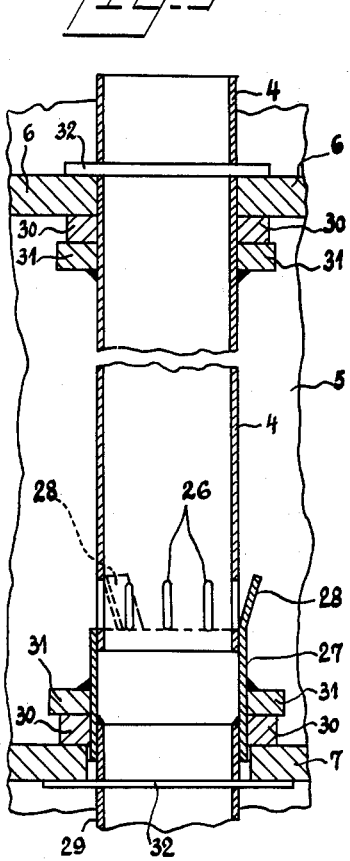
Fig. 3 is a section, drawn to a larger scale, of a tube into which the liquid to be admixed with the gas to be treated is admitted.

The apparatus shown in Figs. 1 and 2 includes a cylindrical vessel indicated as a whole by the reference numeral 1 and divided into a certain number of compartments 3 by means of partitions 2. Each compartment 3 contains a nest of parallel and vertical tubes 4. The tubes 4 extend across a chamber 5 provided with a cover 6 at its upper part and with a fixed bottom plate 7. The chamber 5 serves as a tank for a liquid to be admitted into the tubes 4 and is fitted with a level gauge 8, a liquid supply pipe 9 and a tube 25 adapted to balance the pressure in the chamber 5 with the pressure prevailing in the underlying expansion chamber 10, to which is connected a duct 11 for the withdrawal of the treated gases. The tubes 4 protruding into the expansion chamber 10 terminate at a certain distance from a supporting plate 12 carrying slabs 13 the upper face of which forms an impact surface against which the mixtures of gas and liquid issuing from the tubes 4 are projected. Each compartment 3 has its top portion provided with a cover 33, so as to provide access to the inside of the compartments for cleaning or other purposes, and to permit the removal of the cover 6 from which the tubes 4 are suspended. The gas is supplied to the compartments 3 of the apparatus through a duct 14 connected to a duct 15 extending all around the vessel 1. The ducts 11, 14 and 15 are fitted with closure members 16, 17 and 18, whereby the various compartments 3 may be put in or out of the system and may be connected in parallel or in series.

The liquid that separates from the gas when the mixture of gas and liquid is projected against the impact slabs 13 is collected underneath the support 12 in a chamber 19, whence the liquid flows to a receiver 20 provided with an outlet duct 21.

As shown in Fig. 1, screw-jacks 22 are used to adjust the distance between the impact plates 13 and the lower ends of the tubes 4. Such adjustment makes it possible to provide the arrangement which is most suitable for the purpose sought, taking into consideration the rate of flow of the gases, the amount to which the latter are loaded with vapours, dust and other impurities, the desired efficiency of the process to be carried out, etc.

The upper portion of the apparatus is further provided, as shown, with screw-jacks 23, which are adapted, as will appear in the course of this specification with reference to Fig. 3, to provide for the adjustment of the quantity of liquid to be admitted into the tubes 4.

As shown diagrammatically in Fig. 1, seals 24, such as hydraulic or sand seals, are provided around the jacks 22 and 23 to prevent leakage of gas and/or liquid from the apparatus.

When the apparatus is used for purifying or cooling down a gas or for causing a reaction between gases, a gas admitted into one compartment 3 of the apparatus through the duct 14 will be uniformly distributed over the tubes 4, where a predetermined quantity of a liquid arriving from chamber 5 is admixed therewith. The gas-liquid mixture becomes highly intimate on account of its high turbulence, which is a requirement whatever be the contemplated process, viz purification, refrigeration or reaction of a gas by/or with a liquid. The gas-liquid mixture will strike the impact plates or slabs 13, preferably at a velocity of from 15 to 30 metres per second, and the liquid loaded with the impurities from the gas separates from the latter upon impinging against the slabs and will be collected in the receiver 20, while the purified gas flows through the expansion chamber 10, where it is expanded down to a velocity of about 5 m. per second, whereupon it reaches the discharge duct 11. In case the gas discharged from the duct 11 is not sufficiently purified, it may be conveyed to another compartment 3 of the apparatus to complete the purification.

This applies also to heat exchange, absorption or reaction.

The liquid having acted upon the gas when in intimate mixture therewith, separates therefrom after impingement against the slabs 13, the separation taking place during the travel of the mixture across the expansion chamber 10. Should the effect achieved prove insufficient, the gas may be conveyed to another compartment 3, as mentioned above, in order to complete the process contemplated.

Figure 4:
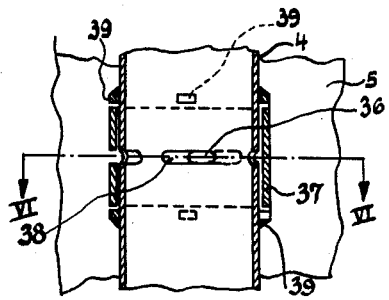
Fig. 4 is a further vertical sectional view of a portion of a tube, taken along line V—V of Fig. 5.

In Figs. 3 and 4, means have been shown which are suitable to secure the admission of a liquid contained in chamber 5 into the tubes 4.

In Fig. 3, the tube 4 has a certain number of holes 26 providing a connection between the inside of the tube and the chamber 5 across which said tube extends. At its lower portion, the tube 4 is surrounded by a stationary sleeve 27 provided with guides 28. By operating the jacks 24 (Fig. 1), the tubes 4 may be moved axially, so as to cause the tubular sleeves 27 to cover more or less the holes 26 of the tubes 4.

Due to the above described arrangement, it is possible, by varying the cross sectional area of the holes 26 at will, to adjust the quantity of liquid admitted through those holes into the tubes 4.

The tubular sleeve 27 has welded thereto a tubular section 29 of same diameter as the tube 3, said section protruding into the expansion chamber 10.

As further shown in Fig. 3, a rubber packing 30 is interposed between the ring 31 welded to the tube 4 and the cover 6 of chamber 5, the packing 30 being clamped by means of a key pin 32. Likewise, the tubular screen 27 is provided with a stationary ring 31 adapted to maintain the rubber packing 30 against the stationary plate 7, a key pin 32 being also used in this instance for clamping the packing 30.

Moreover, the rate of flow of the liquid admitted into the tubes 4 may be varied by modifying the level of the liquid contained in chamber 5 above the bottom 7.

Figure 5:
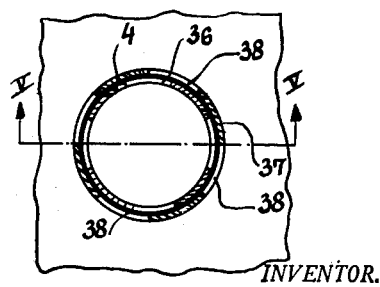
Fig. 5 is a section on line VI—VI of Fig. 4.

In Figs. 4 and 5, an arrangement has been shown whereby the cross sectional area of the holes formed in the tube 4 may be adjusted. Instead of vertically extending holes or slots such as the holes 26 formed in tube 4 (Fig. 3), the tube 4 of Fig. 4 shows horizontally extending holes or slots 36. A sleeve 37 provided with holes 38 surrounds the tube 4 and may be rotated with respect thereto, so as to cause the holes 36 and 38 to register more or less. Guide members 39 carried by the tube 4 serve to hold the sleeve 37 in place thereon.

Because the tubes 4 conveying the gas supplied by the duct 14 may be sealed at will, while at the same time the holes 26 or 36 of the tubes 4 in the compartments 3 of the apparatus may be given the desired cross section, it is possible to obtain the optimum velocities required for the circulation of the gas and the most suitable rates of liquid flow. These adjustments in combination with the available adjustment of the distance between the impact slabs 13 and the low end of the tubes 4, make it possible to achieve an optimum efficiency in the apparatus.

In some instances it may be necessary, in view of the adjustment of the effect due to turbulence in the tubes, to be able to admit the liquid at various levels along the length of the tube 4, thus securing a longer or shorter time of contact between the gas and the liquid during their travel through the tubes 4. This may be achieved e. g. by using several liquid chambers 5 arranged on top of one another and each having a series of holes in the walls of the tubes 4, as shown in Fig. 6. Each chamber 5 includes a duct 40 provided with a cock 41 for admitting the liquid into the chamber.

It will be easily understood that, because the above described apparatus secures an intimate contact between the gases and the liquid, the droplets of the latter being atomized in the gases flowing through the tubes 4, the said apparatus is suitable for any process such as purification, heat exchange, drying, absorption, reaction, etc. in which such a contact is required.

It will be obvious that the invention is not limited exclusively to the above described embodiment or to those of the particular arrangements illustrated in the drawings and that several modifications may be made therein without departing from the scope of the invention such as defined by the appended claims.

What I claim is:

1. An apparatus for purifying gases by means of a liquid, comprising a vessel, internal partitions defining within said vessel several compartments, each compartment comprising an input and an output, means for connecting the output of one compartment to the input of another compartment, each compartment comprising a series of vertical and circular tubes, holes provided at the periphery of said tubes, non perforated sleeves mounted concentrically with said tubes, means for causing the sleeves to shut more or less the holes provided in said tubes, by causing a relative axial motion between the tubes and the sleeves, an enclosure surrounding said tubes and adapted to contain a liquid to be mixed with a gas circulating in said tubes, an impact surface adapted to have projected thereon the jets of mixed gas and liquid issuing from said tubes, and an expansion chamber.

2. An apparatus for purifying gases by means of a liquid comprising a vessel, internal partitions defining within said vessel several compartments, each compartment comprising an input and an output, means for connecting the output of one compartment to the input of another compartment, each compartment comprising a series of vertical and circular tubes, means for imparting axial motion to said tubes, holes provided at the periphery of said tubes, non perforated and stationary sleeves mounted concentrically with said tube, an enclosure surrounding said tubes and adapted to contain a liquid to be mixed with a gas circulating in said tubes, an impact surface adapted to have projected thereon the jets of mixed gas and liquid issuing from said tubes, and an expansion chamber.

References Cited in the file of this patent

UNITED STATES PATENTS

| Number | Name | Date |
|---|---|---|
| 1,004,578 | Lavigne | Oct. 3, 1911 |
| 1,042,556 | Holland et al. | Oct. 29, 1912 |
| 1,803,956 | Bergman | May 5, 1931 |
| 2,097,605 | Schierenbeck | Nov. 2, 1937 |
| 2,385,200 | Friedel | Sept. 18, 1945 |
| 2,437,526 | Heidbrink et al. | Mar. 9, 1948 |
| 2,519,618 | Wilson et al. | Aug. 22, 1950 |
| 2,523,126 | Long | Sept. 19, 1950 |
| 2,560,077 | Bloomer et al. | July 10, 1951 |
| 2,642,254 | Armstrong | June 16, 1953 |